United States Patent
Huang (10) Patent No.: US 12,091,021 B2
(45) Date of Patent: Sep. 17, 2024

(54) METHOD AND SYSTEM FOR ENHANCING DRIVING SAFETY

(71) Applicant: MiTAC Digital Technology Corporation, Taoyuan (TW)

(72) Inventor: Hsun-Wen Huang, Taoyuan (TW)

(73) Assignee: MiTac Digital Technology Corporation, Taoyuan (TW)

( * ) Notice: Subject to any disclaimer, the term of this patent is extended or adjusted under 35 U.S.C. 154(b) by 262 days.

(21) Appl. No.: 17/661,994

(22) Filed: May 4, 2022

(65) Prior Publication Data

US 2022/0355804 A1  Nov. 10, 2022

(30) Foreign Application Priority Data

May 5, 2021 (TW) .................. 110116228

(51) Int. Cl.
*B60W 40/09* (2012.01)
*B60W 50/14* (2020.01)
*G10L 15/18* (2013.01)

(52) U.S. Cl.
CPC ............ *B60W 40/09* (2013.01); *B60W 50/14* (2013.01); *G10L 15/1815* (2013.01); *B60W 2420/403* (2013.01); *B60W 2420/54* (2013.01); *B60W 2540/21* (2020.02); *B60W 2540/22* (2013.01)

(58) Field of Classification Search
CPC ................ B60W 40/09; B60W 50/14; B60W 2420/403; B60W 2420/54; B60W 2549/21; B60W 2549/22; G10L 15/1815; G10L 25/63; G10L 15/26

See application file for complete search history.

(56) References Cited

U.S. PATENT DOCUMENTS

| | | | |
|---|---|---|---|
| 12,001,755 B2 * | 6/2024 | Kim | G16H 50/20 |
| 2019/0185014 A1 * | 6/2019 | Choo | G05D 1/0214 |
| 2022/0383886 A1 * | 12/2022 | Cox | G07C 5/0825 |

FOREIGN PATENT DOCUMENTS

| | | | | |
|---|---|---|---|---|
| CN | 109572705 A | | 4/2019 | |
| CN | 110008879 A | * | 7/2019 | ......... G06K 9/00302 |
| CN | 111329498 A | * | 6/2020 | ........... A61B 5/0077 |
| CN | 111605556 A | * | 9/2020 | ............ B60W 40/08 |
| CN | 112078588 A | | 12/2020 | |

OTHER PUBLICATIONS

CN-109572705-A: machhine generated translation (Year: 2019).*
CN-112078588-A: machine generated translation (Year: 2020).*

(Continued)

*Primary Examiner* — Michael J Zanelli
(74) *Attorney, Agent, or Firm* — Lewis Roca Rothgerber Christie LLP (57) ABSTRACT

A method for enhancing driving safety is provided. A sound receiving unit receives sound with respect to a space of a vehicle. A processing unit determines whether an in-vehicle atmosphere is related to a negative emotion based on the sound thus received, and defines at least one of an unsafe driving condition or a safety enhancement program based on the determination. When a current operation of the vehicle meets the unsafe driving condition, the safety enhancement program is executed to enhance driving safety.

18 Claims, 2 Drawing Sheets

(56) References Cited

OTHER PUBLICATIONS

Braun et al.; Improving Driver Emotions with Affective Strategies; Multimodal Technologies and Interact, www.mdpi.com/journal/mti; Mar. 12, 2019; pp. 1-16 (Year: 2019).*

Khodairy et al.; Driving Behavior Classification Based on Oversampled Signals of Smartphone Embedded Sensors Using an Optimized Stacked-LSTM Neural Networks; IEEE Access; Jan. 1, 20212; vol. 9, 2021; pp. 4957-4972 (Year: 2021).*

Leone et al.; Vision-Based Road Rage Detection Framework in Automotive Safety Applications; Sensors 2021, 21, 2942. https://doi.org/10.3390/s21092942; Apr. 22, 2021; pp. 1-20 (Year: 2021).*

Tawari et al.; Speech Based Emotion Classification Framework for Driver Assistance System; 2010 IEEE Intelligent Vehicles Symposium University of California, San Diego, CA, USA Jun. 21-24, 2010; pp. 174-178 (Year: 2010).*

Search Report appended to an Office Action, which was issued to Taiwanese counterpart application No. 110116228 by the TIPO on Dec. 16, 2021, with an English translation thereof.

* cited by examiner

METHOD AND SYSTEM FOR ENHANCING DRIVING SAFETY

CROSS-REFERENCE TO RELATED APPLICATION

This application claims priority of Taiwanese Invention Patent Application No. 110116228, filed on May 5, 2021.

FIELD

The disclosure relates to a method for assisting vehicle driving, and more particularly to a method and a system for enhancing driving safety.

BACKGROUND

Emotion will affect human behavior. For example, when a driver is driving in a bad mood or under influence of negative emotions, such as nervousness, agitation, anger, etc., he,she may have a higher chance of having impulsive and dangerous driving behaviors (such as the so-called "road rage"). Negative emotions are also more likely to cause distractions and make those affected less able to make appropriate responses to unexpected situations on the road, which will increase the risk of traffic accidents.

Negative emotions are inevitable, but driving in a distracted and dangerous way under the influence of negative emotions may cause serious accidents, and should thus be prevented.

SUMMARY

Therefore, an object of the disclosure is to provide a method that performs negative emotion detection on in-vehicle atmosphere, so as to provide appropriate assistance mechanism in terras of driving safety accordingly.

According to the disclosure, the method for enhancing driving safety is to be implemented by a system that includes a sound receiving unit, a storage unit and a processing unit, and includes steps of: by the sound receiving unit mounted to a vehicle that defines a space for a driver to stay in when driving the vehicle, receiving sound with respect to the space of the vehicle, wherein the storage unit stores driving safety enhancement data that is related to an unsafe driving condition and a safety enhancement program that correspond to a predefined unsafe driving behavior; by the processing unit, determining whether an in-vehicle atmosphere is related to a negative emotion based on the sound received by the sound receiving unit; by the processing unit, defining at least one of the unsafe driving condition or the safety enhancement program based on a result of determining whether the in-vehicle atmosphere is related to a negative emotion; by the processing unit, determining whether a current operation of the vehicle meets the unsafe driving condition; and by the processing unit, upon determining that the current operation of the vehicle meets the unsafe driving condition, executing the safety enhancement program to enhance driving safety Another object of the disclosure is to provide a system that implements the method of this disclosure. According to the disclosure, the system is adapted for use with a vehicle to enhance driving safety, where the vehicle defines a space for a driver to stay in when driving the vehicle. The system includes a sound receiving unit, a storage unit and a processing unit. The sound receiving unit is to be mounted to the vehicle. The storage unit stores driving safety enhancement data. The driving safety enhancement data is related to an unsafe driving condition and a safety enhancement program that correspond to a predefined unsafe driving behavior. The processing unit is electrically connected to the sound receiving unit and the storage unit. The processing unit is configured to control the sound receiving unit to receive sound with respect to the space of the vehicle, to determine whether an in-vehicle atmosphere is related to a negative emotion based on the sound received by the sound receiving unit, to define at least one of the unsafe driving condition or the safety enhancement program based on a result of determining whether the in-vehicle atmosphere is related to a negative emotion, to determine whether a current operation of the vehicle meets the unsafe driving condition, and to, upon determining that the current operation of the vehicle meets the unsafe driving condition, execute the safety enhancement program to enhance driving safety

BRIEF DESCRIPTION OF THE DRAWINGS

Other features and advantages of the disclosure will become apparent in the following detailed description of the embodiment (s) with reference to the accompanying drawings, of which.

DETAILED DESCRIPTION

Before the disclosure is described in greater detail, it should be noted that where considered appropriate, reference numerals or terminal portions of reference numerals have been repeated among the figures to indicate corresponding or analogous elements, which may optionally have similar characteristics. Further, if not specifically defined, the term "electrical connection" in the description may refer to either a "wired connection" between multiple electronic apparatuses,devices,components that are connected to each other by conductive materials, or a "wireless connection" for uni- or bi-directional wireless signal transmission through wireless communication technology. Moreover, if not specifically defined, the "electrical connection" mentioned in the description may refer to either "direct electrical connection" formed by the direct connection between multiple electronic apparatuses,devices,components or "indirect electrical connection" formed by the indirect connection between multiple electronic apparatuses,devices,components through other electronic apparatuses,devices,components.

Figure 1:
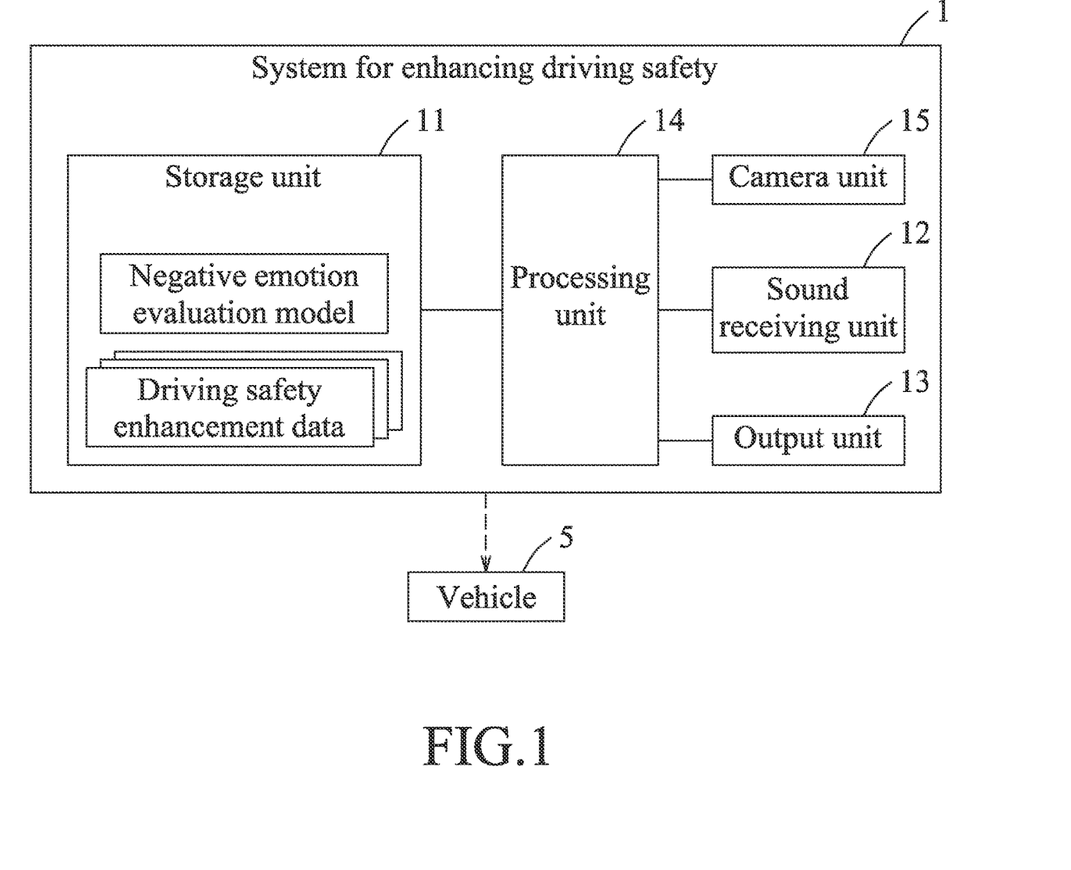
FIG. 1 is a block diagram illustrating an embodiment of a system for enhancing driving safety according to the disclosure.

Referring to FIG. 1, an embodiment of a system 1 for enhancing driving safety according to this disclosure is adapted for use with a vehicle 5 that defines a space for a driver to stay in when driving the vehicle 5. In some embodiments, the space may refer to a seating space that is configured to accommodate the driver and one or more passengers, but this disclosure is not limited in this response. In this embodiment, the vehicle 5 may be, for example but not limited to, a bus, a car, or other types of vehicles.

In this embodiment, the system 1 includes a storage unit 11, a sound receiving unit 12, an output unit 13, and a processing unit 14 that is electrically connected to the storage unit 11, the sound receiving unit 12 and the output unit 13.

The storage unit 11 may be a computer-readable medium such as a memory module, a hard disk drive, a solid state drive, or other types of storage devices that are configured to store data (e.g., analog data and,or digital data) therein. In some embodiments, the storage unit 11 may be a cloud storage device that is not set up in the vehicle 5, and this disclosure is not limited in this respect.

The sound receiving unit 12 includes a plurality of microphones that are mounted to the vehicle 5, and that are operable by the processing unit 14 to receive sound with respect to the space of the vehicle 5. In some embodiments, at least one of the microphones is disposed proximate to a driver's seat to receive sound around the driver's seat. In some embodiments where the vehicle 5 is small (e.g., a four-seat car), the sound receiving unit 12 may include only one microphone, but this disclosure is not limited in this respect.

The output unit 13 may include, for example but not limited to, a display and,or a buzzer, and may be disposed around the driver's seat for attracting the driver's attention more effectively.

The processing unit 14 may include, for example but not limited to, a central processing unit (CPU) that is disposed in the vehicle 5 and that is communicatively connected to an onboard diagnostic (OBD) or an electronic control unit (ECU) (not shown) of the vehicle 5. The processing unit 14 receives a variety of operation parameters (e.g., a travelling speed, an accelerator signal, a brake signal, etc.) of the vehicle 5 from the ECU or OBD. In some embodiments, the processing unit 14 may further include a cloud server that is communicatively connected to the CPU via a network (e.g., the Internet). That is, in some embodiments, it may be possible that only a part of the processing unit 14 is disposed in the vehicle 5, but this disclosure is not limited in this respect. In the embodiments where the processing unit 14 includes the cloud server, the storage unit 11 may be a part of the cloud server and is disposed in the cloud server.

In some embodiments, the system 1 may be manufactured and sold as a single product, and may be additionally installed on the vehicle 5 after production of the vehicle 5 is completed. In some embodiments, the system 1 may be a built-in system that is installed on the vehicle 5 during production of the vehicle 5. In some embodiments, the processing unit 14 may be integrated into the ECU or OBD. However, this disclosure is not limited in this respect.

The storage unit 11 stores a negative emotion evaluation model that is used to evaluate an emotional atmosphere in the vehicle 5 (referred to as in-vehicle atmosphere hereinafter), and driving safety enhancement data that corresponds to one or more predefined unsafe driving behaviors. The negative emotion evaluation model may be established using conventional affective computing technologies, and details thereof are omitted herein for the sake of brevity. In this embodiment, the driving safety enhancement data is exemplified to correspond to multiple predefined unsafe driving behaviors, but this disclosure is not limited in this respect.

In this embodiment, the negative emotion evaluation model is based on speech recognition and,or natural language processing. The processing unit 14 that executes the negative emotion evaluation model performs semantic recognition and volume detection on the sound received by the sound receiving unit 12 in real time, and calculates a negative emotion score based on a result of the semantic recognition and the volume detection. For example, the negative emotion evaluation model that is executed by the processing unit 14 may use, for example but not limited to, a support vector machine (SVM), machine learning (e.g., hidden Markov model (HMM), deep neural network (DNN), etc.), and so on, to classify emotion of the driver (e.g., determining whether the emotion of the driver is a negative emotion), and to calculate the negative emotion score based on whether the sound received by the sound receiving unit 12 includes words or sentences that reflect negative emotions, and on whether the volume of the sound received by the sound receiving unit 12 has a gradually increasing trend. However, the algorithm to calculate the negative emotion score may be adjusted based on experience and,or requirements of developers, and this disclosure does not focus on this respect, so details thereof are omitted herein for the sake of brevity.

The driving safety enhancement data may, for each of the predefined unsafe driving behaviors, relate to an unsafe driving condition and a safety enhancement program that correspond to the predefined unsafe driving behavior, wherein the safety enhancement program corresponds to the unsafe driving condition, and defines an action to be taken when the unsafe driving condition is satisfied. The predefined unsafe driving behaviors may include, for example but not limited to, speeding, frequent rapid-acceleration, frequent hard-braking, etc. For each of the predefined unsafe driving behaviors, a part of the driving safety enhancement data that corresponds to the predefined unsafe driving behavior may include a first vehicle operation criterion and a second vehicle operation criterion of a driving behavior parameter that corresponds to the predefined unsafe driving behavior, and a first assisting program and a second assisting program that correspond to the predefined unsafe driving behavior and that are different from each other. The second vehicle operation criterion is a precondition of the first vehicle operation criterion (i.e., a condition that, if the first vehicle operation criterion is satisfied, will be satisfied before the first vehicle operation criterion can be satisfied).

In a case that the predefined unsafe driving behavior is related to speeding, as an example, the first vehicle operation criterion may be that a speed of the vehicle 5 is greater than 60 km/hr, and the second vehicle operation criterion may be that the speed of the vehicle 5 is greater than 50 km/hr, so the second vehicle operation criterion will be satisfied before the first vehicle operation criterion is satisfied. On the other hand, the first assisting program may relate to, for example, an action of controlling the output unit 13 to output a speeding warning notification to notify the driver of a speeding condition, and the second assisting program may relate to, for example, an action of limiting a maximum speed of the vehicle 5 to 40 km/hr, so as to force the vehicle 5 to decelerate.

In a case that the predefined unsafe driving behavior is related to frequent rapid-acceleration, as an example, the first vehicle operation criterion may be that an accelerator pedal of the vehicle 5 is heavily slammed three times within a predetermined length of time, and the second vehicle operation criterion may be that the accelerator pedal of the vehicle 5 is heavily slammed two times within the predetermined length of time, so the second vehicle operation criterion will be satisfied before the first vehicle operation criterion is satisfied. On the other hand, the first assisting program may related to, for example, an action of controlling the output unit 13 to output a notifying message to advise the driver to avoid aggressive driving, and the second assisting program may relate to, for example, an action of sending a warning message of aggressive driving to an external electronic device. In some embodiments, the external electronic device may be owned by a manager of a transportation organization to which the vehicle 5 belongs, such as a taxi service company. The external electronic device outputs the warning message Indicating that the driver is driving aggressively, so the manager can take appropriate actions on such a situation in a timely fashion.

It is noted that each of the first arid second assisting programs may be configured and,or adjusted as desired according to the corresponding one of the predefined unsafe driving behaviors. For example, the processing unit 14 may control the output unit 13 to output the notifications or the messages either audibly (e.g., by the buzzers) or visibly (e.g., in a form of text or images outputted by the display), make the ECU or OBD use a warning light or the speaker of the vehicle 5 to output the notifications or the messages, or activate a driving assistance mechanism (e.g., auto-deceleration, auto-braking, etc.), but this disclosure is not limited in this respect.

Figure 2:
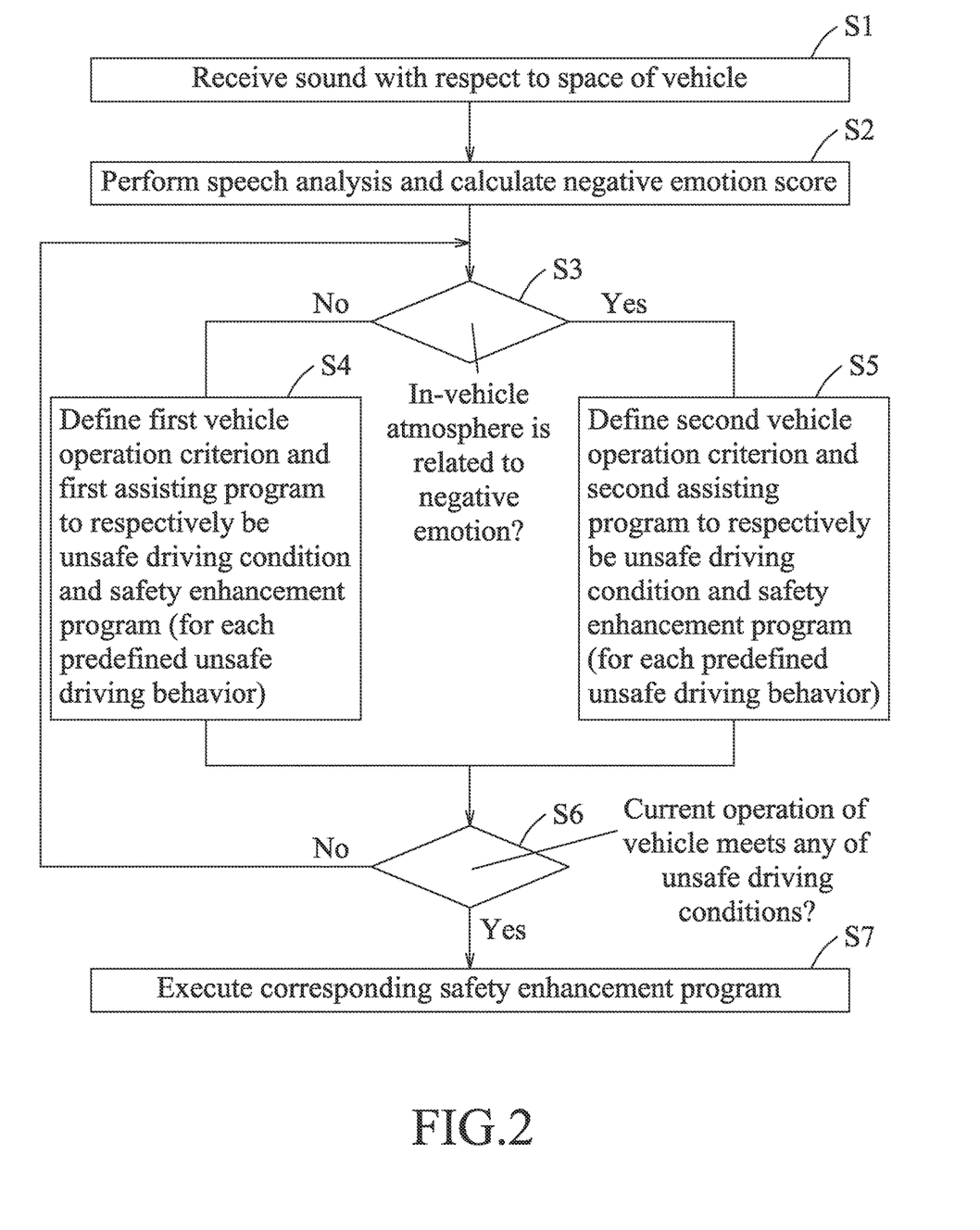
FIG. 2 is a flow chart illustrating steps of an embodiment of a method for enhancing driving safety according to the disclosure.

Referring to FIGS. 1 and 2, the system 1 performs a first embodiment of a method that includes steps S1 to S7 according to this disclosure for enhancing driving safety.

In step S1, the processing unit 14 controls the sound receiving unit 12 to receive sound with respect to the space of the vehicle 5 in real time, so as to obtain in-vehicle sound data. Then, the flow goes to step S2 while the sound receiving unit 12 continuously performs sound reception and the processing unit 14 continuously receives updated in-vehicle sound data.

In step S2, the processing unit 14 that executes the negative emotion evaluation model performs real-time speech analysis on the in-vehicle sound data, calculates the negative emotion score based on the analysis result, and continuously updates the negative emotion score in real time with the update of the in-vehicle sound data. In this embodiment, the speech analysis performed by the processing unit 14 includes sematic recognition and volume detection, but this disclosure is not limited in this respect. The flow goes to step S3 while the processing unit 14 continuously calculates and updates the negative emotion score.

In step S3, the processing unit 14 compares the negative emotion score with a predetermined threshold to determine whether the in-vehicle atmosphere is related to a negative emotion. In detail, the processing unit 14 determines that the in-vehicle atmosphere is related to a negative emotion when the negative emotion score is equal to or greater than the predetermined threshold, and determines that the in-vehicle atmosphere is not related to a negative emotion when the negative emotion score is smaller than the predetermined threshold. In this embodiment, since the negative emotion score is calculated by performing speech analysis on the in-vehicle sound data (i.e., data of sound received by the sound receiving unit 12), the determination of the in-vehicle atmosphere being related to a negative emotion represents that oral dispute or conflict may be taking place in the vehicle 5 (e.g., the driver may be having a quarrel with a passenger).

If the processing unit 14 determines in step S3 that the in-vehicle atmosphere is not related to a negative emotion, the flow goes to step S4. Otherwise, the flow goes to step S5.

In step S4, the processing unit 14 defines, for each of the predefined unsafe driving behaviors, the first vehicle operation criterion that corresponds to the predefined unsafe driving behavior to be the unsafe driving condition for the predefined unsafe driving behavior, and the first assisting program that corresponds to the predefined unsafe driving behavior to be the safety enhancement program for the predefined unsafe driving behavior, rather than defining the second vehicle operation criterion and the second assisting program to respectively be the unsafe driving condition and the safety enhancement program for the predefined unsafe driving behavior. In other words, when the processing unit 14 determines that the in-vehicle atmosphere is not related to a negative emotion, for each of the predefined unsafe driving behaviors, only the corresponding first vehicle operation criterion is set to be the unsafe driving condition, and only the corresponding first assisting program is set to be the safety enhancement program.

In step S5, the processing unit 14 defines, for each of the predefined unsafe driving behaviors, the second vehicle operation criterion that corresponds to the predefined unsafe driving behavior to be the unsafe driving condition for the predefined unsafe driving behavior, and the second assisting program that corresponds to the predefined unsafe driving behavior to be the safety enhancement program for the predefined unsafe driving behavior, rather than defining the first vehicle operation criterion and the first assisting program to respectively be the unsafe driving condition and the safety enhancement program for the predefined unsafe driving behavior. In other words, when the processing unit 14 determines that the in-vehicle atmosphere is related to a negative emotion, for each of the predefined unsafe driving behaviors, only the corresponding second vehicle operation criterion is set to be the unsafe driving condition, and only the corresponding second assisting program is set to be the safety enhancement program.

After the unsafe driving condition and the safety enhancement program are defined for each of the predefined unsafe driving behaviors in step S4 or S5, the flow goes to step S6.

In step S6, the processing unit 14 determines,for each of the predefined unsafe driving behaviors,whether a current operation of the vehicle 5 meets the unsafe driving condition that corresponds to the predefined unsafe driving behavior (i.e., determining whether the current operation of the vehicle 5 meets any of the unsafe driving conditions that respectively correspond to the predefined unsafe driving behaviors), where data of the current operation of the vehicle 5 (e.g., the speed, the accelerator signal, the brake signal, etc.) may be obtained from the ECU or OBD of the vehicle 5.

It is noted that, upon determining in step S3 that the in-vehicle atmosphere is not related to a negative emotion, the processing unit 14 defines the first vehicle operation criterions that respectively correspond to the predefined unsafe driving behaviors to be the unsafe driving conditions in step S4, so the processing unit 14 actually determines in step S6 whether the current operation of the vehicle 5 meets any of the first vehicle operation criterions, and does not use any of the second vehicle operation criterions to make the determination. On the other hand, upon determining in step S3 that the in-vehicle atmosphere is related to a negative emotion, the processing unit 14 defines the second vehicle operation criterions that respectively correspond to the predefined unsafe driving behaviors to be the unsafe driving conditions in step S5, so the processing unit 14 actually determines in step S6 whether the current operation of the vehicle 5 meets any of the second vehicle operation criterions, and does not use any of the first vehicle operation criterions to make the determination.

When the determination made in step S6 is affirmative (i.e., the current operation of the vehicle 5 meets at least one of the unsafe driving conditions that respectively correspond to the predefined unsafe driving behaviors, the flow goes to step S7. Otherwise, the flow goes back to step S3.

In step S7, the processing unit 14 executes, for each of the unsafe driving conditions that the current operation of the vehicle 5 meets, the safety enhancement program that corresponds to the unsafe driving condition so as to enhance driving safety. After completion of step S7, the flow may go back to S3, but this disclosure is not limited in this respect.

It is noted that, upon determining in step S3 that the in-vehicle atmosphere is not related to a negative emotion, the processing unit 14 defines the first assisting programs that respectively correspond to the predefined unsafe driving behaviors to be the unsafe driving conditions in step S4 for each of the unsafe driving conditions that the current operation of the vehicle 5 meets, the safety enhancement program executed by the processing unit 14 in step S7 is actually the first assisting program that corresponds to the predefined unsafe driving behavior, rather than the second assisting program that corresponds to the predefined unsafe driving behavior. On the other hand, upon determining in step S3 that the in-vehicle atmosphere is related to a negative emotion, the processing unit 14 defines the second assisting programs that respectively correspond to the predefined unsafe driving behaviors to be the unsafe driving conditions in step S4, so, for each of the unsafe driving conditions that the current operation of the vehicle 5 meets, the safety enhancement program executed by the processing unit 14 in step S7 is actually the second assisting program that corresponds to the predefined unsafe driving behavior, rather than the first assisting program that corresponds to the predefined unsafe driving behavior.

For example, in the case that the predefined unsafe driving behavior is related to speeding, assuming that the processing unit 14 determines in step S3 that the in-vehicle atmosphere is not related to a negative emotion, the processing unit 14 defines,sets the first vehicle operation criterion (i.e., a speed of the vehicle 5 being greater than 60 km/hr) to be the corresponding unsafe driving condition, and defines/sets the first assisting program (i.e., controlling the output unit 13 to output a speeding warning notification) to be the corresponding safety enhancement program. In other words, when the in-vehicle atmosphere is not related to a negative emotion, the processing unit 14 determines whether the current operation of the vehicle 5 is in a speeding state by determining whether the speed of the vehicle 5 is greater than 60 km/hr in step S6. If the processing unit 14 determines in step S6 that the speed of the vehicle 5 is greater than 60 km/hr (i.e., meeting the unsafe driving condition), the processing unit 14 executes the action of controlling the output unit 13 to output the speeding warning notification (i.e., executing the safety enhancement program) to advise the driver to decelerate the vehicle 5. That is, when the in-vehicle atmosphere is not related to a negative emotion, the processing unit 14 uses the first assisting program of controlling the output unit 13 to output the speeding warning notification as an assistance mechanism to enhance driving safety when the current operation of the vehicle 5 meets the criterion of speeding.

On the other hand, assuming that the processing unit 14 determines in step S3 that the in-vehicle atmosphere is related to a negative emotion, the processing unit 14 defines, sets the second vehicle operation criterion (i.e., a speed of the vehicle 5 being greater than 50 km/hr) to be the corresponding unsafe driving condition, and defines,sets the second assisting program (i.e., limiting a maximum speed of the vehicle 5 to 40 km/hr) to be the corresponding safety enhancement program. In other words, when the in-vehicle atmosphere is related to a negative emotion, the processing unit 14 determines whether the current operation of the vehicle 5 is in a speeding state by determining whether the speed of the vehicle 5 is greater than 50 km/hr in step S6. If the processing unit 14 determines in step S6 that the speed of the vehicle 5 is greater than 50 km/hr (i.e., meeting the unsafe driving condition), the processing unit 14 executes the action of limiting a maximum speed of the vehicle 5 to 40 km/hr (i.e., executing the safety enhancement program) to force deceleration of the vehicle 5 so that the speed the vehicle 5 is traveling is not faster than 40 km/hr. That is, when the in-vehicle atmosphere is related to a negative emotion, the processing unit 14 uses the second assisting program of limiting a maximum speed of the vehicle 5 to 40 km/hr as an assistance mechanism to enhance driving safety when the current operation of the vehicle 5 meets the speeding behavior. In practice, when the safety enhancement program is executed to force the deceleration of the vehicle 5, the processing unit 14 may determine an appropriate brake force based on a current speed of the vehicle 5 and a road condition to achieve a smooth deceleration (e.g., decelerated to the speed limit within 100 meters or within 20 seconds, but this disclosure is not limited to such). In some embodiments where the system 1 further includes a camera unit 15, before decelerating the vehicle 5, the processing unit 14 may determine a safest lane based on images captured by the camera unit 15 to assist the driver in driving the vehicle 5 to the safest lane or to automatically control the vehicle 5 to enter the safest lane (in case the vehicle 5 is capable of self-driving), and decelerate the vehicle 5 after the vehicle has entered the safest lane. In some embodiments, the safest lane may be determined based on locations and speeds of nearby vehicles (i.e., vehicles that run on nearby lanes). In some embodiments, the safest lane is a nearby lane with vehicles running thereon being the farthest from the vehicle 5 compared to vehicles running on other lanes.

Briefly, in the first embodiment, for each of the predefined unsafe driving behaviors, the unsafe driving condition and the safety enhancement program are defined based on whether the in-vehicle atmosphere is related to a negative emotion. The unsafe driving condition when the in-vehicle atmosphere is related to a negative emotion is different from and is more easily met in comparison to the unsafe driving condition when the in-vehicle atmosphere is not related to a negative emotion. Further, in a case that the unsafe driving condition is met, the safety enhancement program when the in-vehicle atmosphere is related to a negative emotion is also different from arid is more proactive (e.g., forced control) in comparison to the safety enhancement program when the in-vehicle atmosphere is not related to a negative emotion, so as to lower the risk to driving safety brought about by manual control under the influence of negative emotions. As a result, the embodiment of the system 1 can use a more cautious criterion to define the unsafe driving behavior and a more proactive mechanism to deal with the unsafe driving behavior when in a high-risk driving environment involving negative emotions (e.g., the driver is in an argument with the passenger(s)), so as to reduce the likelihood of having traffic accidents.

It is noted that the descriptions of steps S1 to S7 and the flow chart shown in FIG. 2 are used to explain one possible implementation of the method for enhancing driving safety according to this disclosure. In practice, the order of steps S1 to S7 may be adjusted, and such implementation still falls within the scope of this disclosure as long as the same effect as described with respect to the first embodiment can be achieved. Therefore, this disclosure is not limited to the abovementioned order of steps S1 to S7.

This disclosure further provides a second embodiment of the method for enhancing driving safety, which differs from the first embodiment in that each of the predefined unsafe driving behaviors corresponds to only one vehicle operation criterion in addition to the first and second assisting programs. Therefore, for each of the predefined unsafe driving behaviors, the unsafe driving condition is the vehicle operation criterion, and does not need to be defined in step SA or S5, so the processing unit 14 only defines the safety enhancement program (i.e., selecting one of the first and second assisting programs to be the safety enhancement program) in step S4 or S5. As a result, for different determinations made with respect to the in-vehicle atmosphere, the processing unit 14 defines different safety enhancement programs, and does not define different unsafe driving conditions for each of the predefined unsafe driving behaviors. In other words, in the second embodiment, the unsafe driving condition is fixed for each of the predefined unsafe driving behaviors, and is irrelevant to whether or not the in-vehicle atmosphere is related to a negative emotion.

This disclosure further provides a third embodiment of the method for enhancing driving safety, which differs from the first embodiment in that each of the predefined unsafe driving behavior corresponds to only one assisting program in addition to the first and second vehicle operation criterions. Therefore, for each of the predefined unsafe driving behaviors, the safety enhancement program is the assisting program, and does not need to be defined in step S4 or S5, so the processing unit 14 only defines the unsafe driving condition (i.e., selecting one of the first and second vehicle operation criterions to be the unsafe driving condition) in step S4 or S5. As a result, for different determinations made with respect to the in-vehicle atmosphere, the processing unit 14 defines different unsafe driving conditions, and does not define different safety enhancement programs for each of the predefined unsafe driving behaviors. In other words, in the third embodiment, the safety enhancement program is fixed for each of the predefined unsafe driving behaviors, and is irrelevant to whether or not the in-vehicle atmosphere is related to a negative emotion.

This disclosure further provides a fourth embodiment of the method for enhancing driving safety, which differs from the first embodiment in that the system 1 further includes a camera unit 15 that is electrically connected to the processing unit 14. The camera unit 15 may include multiple camera modules (not shown) mounted to the vehicle 5 to capture an image (referred to as surroundings image hereinafter) of a surrounding area of the vehicle 5. The surroundings image can be either a static image or a dynamic image, and this disclosure is not limited in this respect. In the fourth embodiment, the predefined unsafe driving behaviors may further include, for example but not limited to, failure to maintain a safe following distance (i.e., too close to a front vehicle), zigzag driving (frequently weaving on a road), failure to give way to straight-moving vehicles when turning, failure to give priority to pedestrians on a pedestrian crossing, etc., which are referred to as surroundings-related unsafe driving behaviors hereinafter. For each of the surroundings-related unsafe driving behaviors, the corresponding first and second vehicle operation criteria may be related to the surroundings image that is captured by the camera unit 15 in real time. In one example, the first vehicle operation criterion may be that the vehicle 5 is spaced apart from a front vehicle by 3 meters, and the second vehicle operation criterion may be that the vehicle 5 is spaced apart from the front vehicle by 6 meters. In one example, the first vehicle operation criterion may be that the vehicle 5 has weaved three times in five seconds, and the second vehicle operation criterion may be that the vehicle 5 has weaved two times in five seconds. In one example, the first vehicle operation criterion may be that the vehicle 5 has not decelerated to 10 km/hr two meters before a pedestrian crossing, and the second vehicle operation criterion may be that the vehicle 5 has not decelerated to 10 km/hr three and a half meters before a pedestrian crossing. Namely, the processing unit 14 determines whether the first vehicle operation criterion or the second vehicle operation criterion is met based on the surroundings image. In the fourth embodiment, the processing unit 14 may further control the camera unit 15 to capture the surroundings image in real time in step S1. Then, in step S6, the processing unit 14 performs image recognition on the surroundings image, and determines whether the current operation of the vehicle 5 meets any of the unsafe driving conditions that respectively correspond to the surroundings-related unsafe driving behaviors based on a result of the image recognition. Since this disclosure does not focus on content of the first and second vehicle operation criteria that correspond to the surroundings-related unsafe driving behaviors, details thereof are omitted herein for the sake of brevity, as long as the second vehicle operation criterion is a precondition of the first vehicle operation criterion, and is to be satisfied before the first vehicle operation criterion is satisfied.

This disclosure further provides a fifth embodiment of the method for enhancing driving safety, which differs from the first embodiment in that, after defining the unsafe driving conditions for the predefined unsafe driving behaviors, the unsafe driving conditions thus defined serve as unsafe driving condition candidates. Then, the processing unit 14 selects at least one of the unsafe driving condition candidates based on at least one of a current time or a current location of the vehicle 5 (which can be acquired from, for example but limited to, a global positioning system (GPS) of the vehicle 5), and determines in step S6 whether the current operation of the vehicle 5 meets any of the selected one(s) of the unsafe driving condition candidates. That is, among all of the unsafe driving condition candidates that respectively correspond to the predefined unsafe driving behaviors, the processing unit 14 only determines whether the current operation of the vehicle 5 meets any of the selected one(s) of the unsafe driving condition candidates, and does not make determination based on any unselected unsafe driving condition candidate. As a result, for a specific time of day (e.g., a period of time when students go to school or get off school) and,or a specific geographic area (e.g., a surrounding area of a school campus), the system 1 of the fifth embodiment can focus on high risk conditions that are more likely to occur during the specific time of day and,or in the specific geographic area, so as to reduce the required computational load when providing appropriate driving safety assistance by executing the corresponding safety enhancement program(s) when any of the selected one(s) of the unsafe driving condition candidates is met. On the other hand, the processing unit 14 may use all the unsafe driving conditions to determine the driving safety assistance beyond the specific time of day and,or when outside the specific geographic area.

It should be noted that the features of the first to fifth embodiments can be mixed in practice. For example, in some embodiments, under different in-vehicle atmospheres (i.e., related to a negative emotion or not), the processing unit 14 may define different unsafe driving conditions and different safety enhancement programs for some predefined unsafe driving behaviors as described in the first embodiment, only define different safety enhancement programs for some other predefined unsafe driving behaviors as described in the second embodiment, and only define different unsafe driving conditions for yet some other predefined unsafe driving behaviors as described in the third embodiment. The processing unit 14 may also use image recognition to determine whether any of the surroundings-related unsafe driving behaviors is met as described in the fourth embodiment, and focus on some specific predefined unsafe driving behaviors (selected based on the current time and,or the current location of the vehicle 5) during a specific time of day or when the vehicle 5 is in a specific geographic area.

To sum up, the embodiments of the system 1 for enhancing driving safety according to this disclosure may define the unsafe driving condition(s) and,or the safety enhancement program(s) based on the in-vehicle atmosphere (related to a negative emotion or not), so different in-vehicle atmospheres may correspond to different criteria with respect to determining occurrence of the unsafe driving behaviors, and correspond to different actions to be taken when the unsafe driving behaviors occur. When the vehicle 5 is being driven in a high-risk condition where the in-vehicle atmosphere is related to a negative emotion, the system 1 may use more cautious criteria and,or more proactive actions to provide driving safety assistance, so as to reduce likelihood of occurrence of potential traffic accidents.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for enhancing driving safety, implemented by a system that includes a sound receiving unit, a storage unit, a camera unit and a processing unit, said method comprising steps of:
   by the sound receiving unit mounted to a vehicle that defines a space for a driver to stay in when driving the vehicle, receiving sound with respect to the space of the vehicle, wherein the storage unit stores driving safety enhancement data that is related to an unsafe driving condition and a safety enhancement program that correspond to a predefined unsafe driving behavior;
   by the processing unit, determining whether an in-vehicle atmosphere is related to a negative emotion based on the sound received by the sound receiving unit;
   by the processing unit, defining at least one of the unsafe driving condition or the safety enhancement program based on a result of determining whether the in-vehicle atmosphere is related to a negative emotion;
   by the processing unit, determining whether a current operation of the vehicle meets the unsafe driving condition;
   by the processing unit, upon determining that the current operation of the vehicle meets the unsafe driving condition, executing the safety enhancement program to enhance driving safety;
   by the camera unit, capturing a surroundings image that is an image of a surrounding area of the vehicle; and
   by the processing unit, performing image recognition on the surroundings image;
   wherein the processing unit determines whether the current operation of the vehicle meets the unsafe driving condition based on a result of the image recognition.

2. The method of claim 1, wherein the storage unit stores a first vehicle operation criterion and a second vehicle operation criterion of a driving behavior parameter that corresponds to the predefined unsafe driving behavior, and the second vehicle operation criterion is a precondition of the first vehicle operation criterion; and
   wherein the step of defining at least one of the unsafe driving condition or the safety enhancement program includes:
     defining the first vehicle operation criterion to be the unsafe driving condition upon determining that the in-vehicle atmosphere is not related to a negative emotion; and
     defining the second vehicle operation criterion to be the unsafe driving condition upon determining that the in-vehicle atmosphere is related to a negative emotion.

3. The method of claim 1, wherein the storage unit stores a first assisting program and a second assisting program that correspond to the predefined unsafe driving behavior and that are different from each other; and
   wherein the step of defining at least one of the unsafe driving condition or the safety enhancement program includes:
     defining the first assisting program to be the safety enhancement program upon determining that the in-vehicle atmosphere is not related to a negative emotion; and
     defining the second assisting program to be the safety enhancement program upon determining that the in-vehicle atmosphere is related to a negative emotion.

4. The method of claim 1, wherein the step of determining whether the in-vehicle atmosphere is related to a negative emotion includes:
   performing semantic recognition and volume detection on the sound received by the sound receiving unit;
   calculating a negative emotion score based on a result of the semantic recognition and the volume detection; and
   comparing the negative emotion score with a predetermined threshold to determine whether the in-vehicle atmosphere is related to a negative emotion.

5. The method of claim 1, further comprising a step of:
   by the processing unit, selecting, based on at least one of a current time or a current location of the vehicle, one of multiple unsafe driving condition candidates each corresponding to a respective unsafe driving behavior;
   wherein the step of determining whether the current operation of the vehicle meets the unsafe driving condition includes, among all of the unsafe driving condition candidates, only determining whether the current operation of the vehicle meets the selected one of the unsafe driving condition candidates.

6. A system adapted for use with a vehicle to enhance driving safety, the vehicle defining a space for a driver to stay in when driving the vehicle, said system comprising:
 a sound receiving unit to be mounted to the vehicle;
 a storage unit storing driving safety enhancement data, the driving safety enhancement data being related to an unsafe driving condition and a safety enhancement program that correspond to a predefined unsafe driving behavior;
 a camera unit that is to be mounted to the vehicle, and that is configured to capture a surroundings image, which is an image of a surrounding area of the vehicle; and
 a processing unit electrically connected to said sound receiving unit, said camera unit and said storage unit;
 wherein said processing unit is configured to control said sound receiving unit to receive sound with respect to the space of the vehicle,
  to determine whether an in-vehicle atmosphere is related to a negative emotion based on the sound received by said sound receiving unit,
  to define at least one of the unsafe driving condition or the safety enhancement program based on a result of determining whether the in-vehicle atmosphere is related to a negative emotion,
  to determine whether a current operation of the vehicle meets the unsafe driving condition,
  to, upon determining that the current operation of the vehicle meets the unsafe driving condition, execute the safety enhancement program to enhance driving safety,
  to perform image recognition on the surroundings image, and
  to determine whether the current operation of the vehicle meets the unsafe driving condition based on a result of the image recognition.

7. The system of claim 6, wherein said storage unit stores a first vehicle operation criterion and a second vehicle operation criterion of a driving behavior parameter that corresponds to the predefined unsafe driving behavior, and the second vehicle operation criterion is a precondition of the first vehicle operation criterion; and
 wherein said processing unit is configured to define the first vehicle operation criterion to be the unsafe driving condition upon determining that the in-vehicle atmosphere is not related to a negative emotion, and to define the second vehicle operation criterion to be the unsafe driving condition upon determining that the in-vehicle atmosphere is related to a negative emotion.

8. The system of claim 6, wherein said storage unit stores a first assisting program and a second assisting program that correspond to the predefined unsafe driving behavior and that are different from each other; and
 wherein said processing unit is configured to define the first assisting program to be the safety enhancement program upon determining that the in-vehicle atmosphere is not related to a negative emotion, and to define the second assisting program to be the safety enhancement program upon determining that the in-vehicle atmosphere is related to a negative emotion.

9. The system of claim 6, wherein said processing unit is configured to perform semantic recognition and volume detection on the sound received by said sound receiving unit, to calculate a negative emotion score based on a result of the semantic recognition and the volume detection, and to compare the negative emotion score with a predetermined threshold to determine whether the in-vehicle atmosphere is related to a negative emotion.

10. The method system of claim 6, wherein said processing unit is configured to select one of multiple unsafe driving condition candidates based on at least one of a current time or a current location of the vehicle, and to, when determining whether the current operation of the vehicle meets the unsafe driving condition, only determine, among all of the unsafe driving condition candidates, whether the current operation of the vehicle meets the selected one of the unsafe driving condition candidates.

11. A method for enhancing driving safety, implemented by a system that includes a sound receiving unit, a storage unit and a processing unit, said method comprising steps of:
 by the sound receiving unit mounted to a vehicle that defines a space for a driver to stay in when driving the vehicle, receiving sound with respect to the space of the vehicle, wherein the storage unit stores driving safety enhancement data that is related to an unsafe driving condition and a safety enhancement program that correspond to a predefined unsafe driving behavior;
 by the processing unit, determining whether an in-vehicle atmosphere is related to a negative emotion based on the sound received by the sound receiving unit;
 by the processing unit, defining at least one of the unsafe driving condition or the safety enhancement program based on a result of determining whether the in-vehicle atmosphere is related to a negative emotion;
 by the processing unit, determining whether a current operation of the vehicle meets the unsafe driving condition;
 by the processing unit, upon determining that the current operation of the vehicle meets the unsafe driving condition, executing the safety enhancement program to enhance driving safety; and
 by the processing unit, selecting, based on at least one of a current time or a current location of the vehicle, one of multiple unsafe driving condition candidates each corresponding to a respective unsafe driving behavior;
 wherein the step of determining whether the current operation of the vehicle meets the unsafe driving condition includes, among all of the unsafe driving condition candidates, only determining whether the current operation of the vehicle meets the selected one of the unsafe driving condition candidates.

12. The method of claim 11, wherein the storage unit stores a first vehicle operation criterion and a second vehicle operation criterion of a driving behavior parameter that corresponds to the predefined unsafe driving behavior, and the second vehicle operation criterion is a precondition of the first vehicle operation criterion; and
 wherein the step of defining at least one of the unsafe driving condition or the safety enhancement program includes:
  defining the first vehicle operation criterion to be the unsafe driving condition upon determining that the in-vehicle atmosphere is not related to a negative emotion; and
  defining the second vehicle operation criterion to be the unsafe driving condition upon determining that the in-vehicle atmosphere is related to a negative emotion.

13. The method of claim 11, wherein the storage unit stores a first assisting program and a second assisting program that correspond to the predefined unsafe driving behavior and that are different from each other; and
 wherein the step of defining at least one of the unsafe driving condition or the safety enhancement program includes:

defining the first assisting program to be the safety enhancement program upon determining that the in-vehicle atmosphere is not related to a negative emotion; and defining the second assisting program to be the safety enhancement program upon determining that the in-vehicle atmosphere is related to a negative emotion.

14. The method of claim 11, wherein the step of determining whether the in-vehicle atmosphere is related to a negative emotion includes:

performing semantic recognition and volume detection on the sound received by the sound receiving unit;

calculating a negative emotion score based on a result of the semantic recognition and the volume detection; and comparing the negative emotion score with a predetermined threshold to determine whether the in-vehicle atmosphere is related to a negative emotion.

15. A system adapted for use with a vehicle to enhance driving safety, the vehicle defining a space for a driver to stay in when driving the vehicle, said system comprising:

a sound receiving unit to be mounted to the vehicle;

a storage unit storing driving safety enhancement data, the driving safety enhancement data being related to an unsafe driving condition and a safety enhancement program that correspond to a predefined unsafe driving behavior; and a processing unit electrically connected to said sound receiving unit and said storage unit;

wherein said processing unit is configured to cooperate with said sound receiving unit and said storage unit to perform the method according to claim 13.

16. The system of claim 15, wherein the storage unit stores a first vehicle operation criterion and a second vehicle operation criterion of a driving behavior parameter that corresponds to the predefined unsafe driving behavior, and the second vehicle operation criterion is a precondition of the first vehicle operation criterion; and wherein the step of defining at least one of the unsafe driving condition or the safety enhancement program includes:

defining the first vehicle operation criterion to be the unsafe driving condition upon determining that the in-vehicle atmosphere is not related to a negative emotion; and defining the second vehicle operation criterion to be the unsafe driving condition upon determining that the in-vehicle atmosphere is related to a negative emotion.

17. The system of claim 15, wherein the storage unit stores a first assisting program and a second assisting program that correspond to the predefined unsafe driving behavior and that are different from each other; and wherein the step of defining at least one of the unsafe driving condition or the safety enhancement program includes:

defining the first assisting program to be the safety enhancement program upon determining that the in-vehicle atmosphere is not related to a negative emotion; and defining the second assisting program to be the safety enhancement program upon determining that the in-vehicle atmosphere is related to a negative emotion.

18. The system of claim 15, wherein the step of determining whether the in-vehicle atmosphere is related to a negative emotion includes:

performing semantic recognition and volume detection on the sound received by the sound receiving unit;

calculating a negative emotion score based on a result of the semantic recognition and the volume detection; and comparing the negative emotion score with a predetermined threshold to determine whether the in-vehicle atmosphere is related to a negative emotion.

* * * * *

UNITED STATES PATENT AND TRADEMARK OFFICE
CERTIFICATE OF CORRECTION

| | | |
|---|---|---|
| PATENT NO. | : 12,091,021 B2 | Page 1 of 1 |
| APPLICATION NO. | : 17/661994 | |
| DATED | : September 17, 2024 | |
| INVENTOR(S) | : Hsun-Wen Huang | |

It is certified that error appears in the above-identified patent and that said Letters Patent is hereby corrected as shown below:

In the Claims

In Column 15, Line 31, in Claim 15, delete "13" and replace with "11".

Signed and Sealed this
Seventh Day of January, 2025

Derrick Brent
*Acting Director of the United States Patent and Trademark Office*